Aug. 2, 1949.　　　　　E. W. DAVIS　　　　2,477,726
LUBRICANT COMPRESSOR HAVING MEANS TO PREVENT
RETROGRADE MOVEMENT OF THE PISTON THEREOF
Filed July 20, 1945
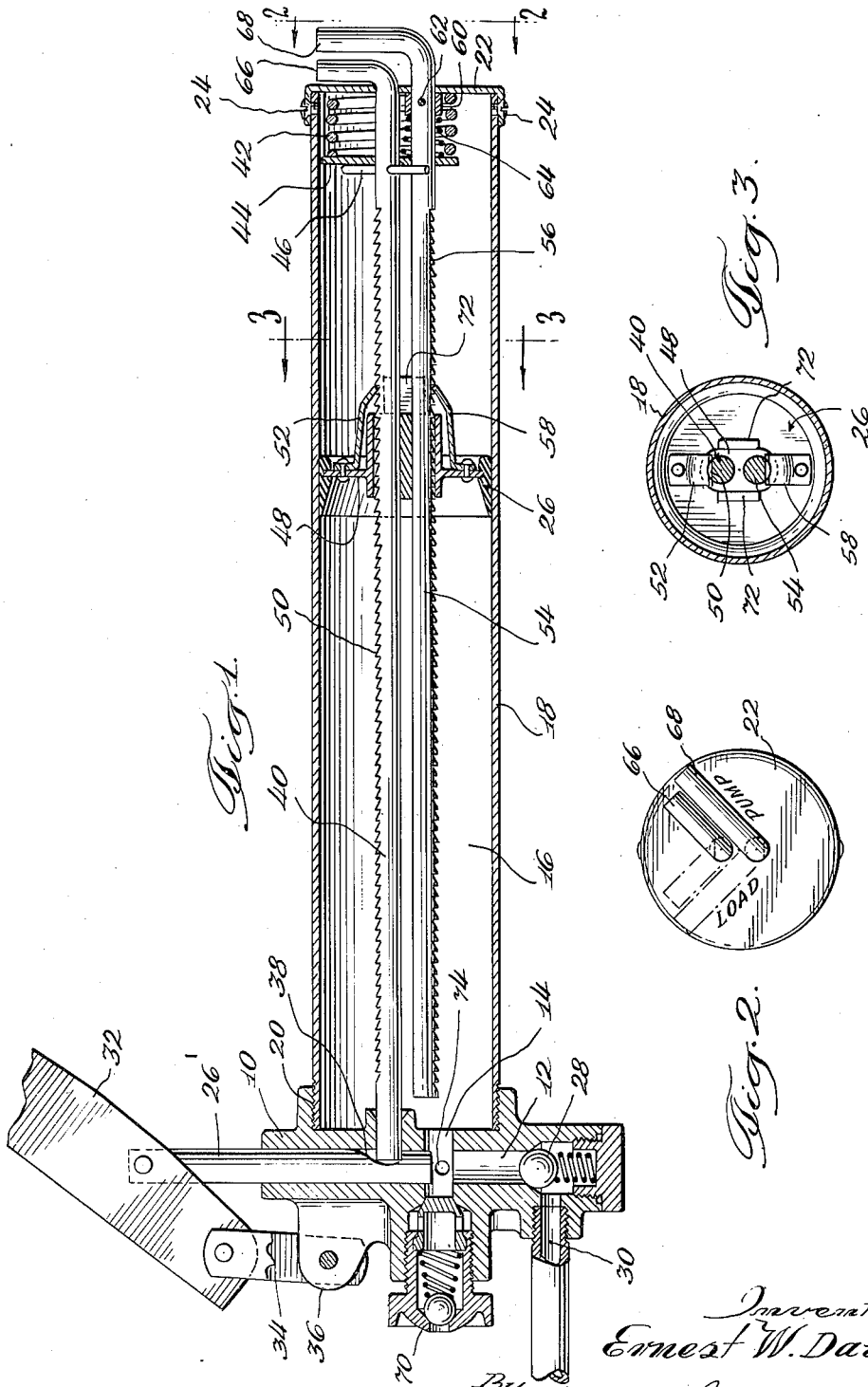
Inventor:
Ernest W. Davis
By Williams, Bradbury & Hinkle
Attorneys

UNITED STATES PATENT OFFICE 2,477,726

LUBRICANT COMPRESSOR HAVING MEANS TO PREVENT RETROGRADE MOVEMENT OF THE PISTON THEREOF

Ernest W. Davis, River Forest, Ill.

Application July 20, 1945, Serial No. 606,193

6 Claims. (Cl. 222—256)

My invention relates to lubricant compressors and is more particularly concerned with hand operated lubricant compressors of the lever type.

An object of my invention is to provide new and improved mechanically operated priming means for a hand operated lubricant compressor of the lever type.

Another object of my invention is to provide new and improved priming means which will permit quicker and more efficient filling of the lubricant reservoir from any usual source of lubricant under pressure.

Other objects and advantages will become apparent as the description proceeds.

In the drawing Fig. 1 is a longitudinal sectional view of a lubricant compressor embodying a preferred form of my invention;

Fig. 2 is an end view looking in the direction of the arrows 2—2 of Fig. 1, and

Fig. 3 is a transverse sectional view taken on the line 3—3 of Fig. 1.

The lubricant compressor which I have illustrated in the drawings comprises a casting 10 having a high pressure lubricant cylinder 12 which is supplied with lubricant by way of a port 14 from a lubricant reservoir 16. The reservoir 16 is provided by a barrel 18 threaded at 20 to the casting 10 and having a head 22 closing the opposite end of the barrel, the head being attached to the barrel in any convenient manner, as for example, by screws 24. A follower piston indicated generally by 26 serves to force the lubricant from the reservoir 16 through port 14 and the high pressure cylinder 12. A piston 26' discharges the lubricant under high pressure from the cylinder 12 past a check valve 28 and into a discharge conduit 30 which may terminate in the usual coupler for forming a quick detachable connection with a lubricant receiving fitting on an automobile bearing or other part requiring lubrication. The piston 26' is reciprocated by a handle 32 attached by a link 34 to an ear 36 forming an integral part of the casting 10.

The piston 26' is provided with a cam shaped recess 38 which receives the rounded, forward end of a rod 40. The rod 40 is urged toward the piston 26' by a spring 42 confined between head 22 and a washer 44 which rests against a cross pin 46 affixed to the rod 40. Each time the piston 26' is moved downwardly by handle 32, rod 40 is moved backwardly or to the right, and upon the return movement of piston 26', the rod 40 is moved forwardly or to the left by spring 42.

The rod 40 extends through one of two cylindrical openings in the hub 48 of follower 26. The upper side of rod 40 as shown in Fig. 1 has ratchet teeth 50 adapted to engage a pawl 52 on follower 26 and urge this follower forwardly to force lubricant from reservoir 16 through port 14 into high pressure cylinder 12 on each upward stroke of the piston 26'.

In order to prevent backward movement of the follower 26 with each backward movement of the rod 40, I provide a second rod 54 having ratchet teeth 56 on its lower side as viewed in Fig. 1. These ratchet teeth 56 engage a second pawl 58 on follower 26 to prevent rearward movement of the follower relative to rod 54. A collar 60 is affixed to rod 54 by a pin 62, and a light spring 64 interposed between this collar and washer 44 holds the collar 60 against head 22 to prevent forward movement of rod 54 when rod 50 and follower 26 are moved forwardly by spring 42.

When all of the lubricant in the reservoir 16 has been discharged and it is desired to refill the reservoir, the upturned ends 66 and 68 of rods 40 and 54, respectively, are turned from the full line position in Fig. 2 to the dotted line position in that figure. This moves the ratchets 50 and 56 out of engagement with the pawls 52 and 58, respectively, and permits follower 26 to slide freely on these rods. Loader valve 70 is then opened and grease is pumped into the reservoir 16 through the opened loader valve in the usual manner. As this grease fills the reservoir 16, it pushes follower 26 backwardly or to the right until the rearward extensions 72 engage washer 44. Thereafter further flow of lubricant into reservoir 16 will compress spring 42 and produce a slight rearward movement of turned-over end 66 and thereby indicate that the reservoir is full.

If the operator should continue to force lubricant through the loader valve, the excess will be discharged past check valve 28 and through discharge conduit 30, provided this conduit terminates in a type of coupler which permits such discharge. In some instances, it may be desirable to provide a special relief port 74 having a conventional loader relief valve through which excess lubricant may be discharged where the operator fails to stop supplying lubricant as soon as handle 66 moves and thereby indicates that the reservoir is full.

After the reservoir has been filled with lubricant, loader valve 70 is closed and the turned-over ends 66 and 68 of the ratchet rods are returned to the full line position shown in Fig. 2. Thereafter operation of the lever 32 to discharge lubricant from the high pressure cylinder 12 will automatically advance follower 26 and insure refilling of the cylinder from the reservoir after each discharge stroke of the piston 26'.

An important advantage of my invention lies in the fact that the advancement of the follower 26 automatically corresponds to the requirements of the high pressure cylinder 12, and it is only necessary that the ratchet mechanism for advancing this follower be capable of giving a rate of advancement equal to or greater than any possible lubricant requirements of the high pressure cylinder. Other advantageous features of my invention reside in the simplicity of the mechanism and the ease with which the reservoir may be refilled.

While I have illustrated and described only a single form of my invention, it is to be understood that my invention may assume numerous other forms and includes all modifications, variations, and equivalents coming within the appended claims.

I claim:

1. A lubricant compressor of the class described, comprising a high pressure cylinder, a piston for discharging lubricant from such cylinder, a reservoir, a follower for forcing lubricant from the reservoir into the high pressure cylinder, a first ratchet rod operated in one direction by said piston, a pawl carried by the follower and engaging said rod, a spring for returning said rod and follower, a second ratchet rod for preventing backward movement of said follower, a second pawl carried by said follower and engaging said second rod, and means for rotating said rods to disengage said pawls when it is desired to refill said reservoir.

2. A lubricant compressor of the lever type, comprising a casting having a high pressure cylinder and a port communicating with said cylinder, a piston for discharging lubricant from said cylinder, a reservoir communicating with said port, a follower in said reservoir for forcing lubricant through said port into said cylinder, a first ratchet means operated by said piston for advancing said follower, a second ratchet means for preventing retrograde movement of said follower, means for refilling said reservoir through said port, and means for rotating said two ratchet means through an arc of 90° for rendering said ratchet means inoperative during the refilling operation.

3. A lubricant compressor of the class described, comprising a body providing a high pressure cylinder and a port communicating therewith, a piston reciprocable in said cylinder, a barrel attached to said body and forming a reservoir for said cylinder, said reservoir being in communication with said port, a follower in said reservoir, a ratchet rod located in said reservoir and extending through said follower, said piston having a cam-shaped recess receiving one end of said rod, a head closing the end of said barrel remote from said body, said rod extending through said head and having a turned-over end outside of said barrel, a spring resting on said head and urging said rod and follower toward said piston, a pawl on said follower engaging said rod, a second ratchet rod extending through said head and follower and having a turned-over end outside of said barrel, a pawl carried by said follower and engaging said second rod, means engaging said head to prevent backward movement of said second rod, said rods having smooth portions extending longitudinally thereof whereby rotation of said rods by said turned-over ends disengages said pawls from the ratchet provided by said rods.

4. A lubricant compressor of the class described, comprising a high pressure cylinder, a piston for discharging lubricant from such cylinder, a reservoir, a follower for forcing lubricant from the reservoir into the high pressure cylinder, a ratchet rod operated in one direction by said piston, a pawl carried by the follower and engaging said rod, a spring for returning said rod and follower, means for preventing backward movement of said follower, and means for rotating said rod to disengage said pawl when it is desired to refill said reservoir.

5. A lubricant compressor of the lever type, comprising a casting having a cylinder and a port communicating with said cylinder, a piston for discharging lubricant from said cylinder, a reservoir communicating with said port, a follower in said reservoir for forcing lubricant through said port into said cylinder, a first ratchet means operated by said piston for advancing said follower, a second ratchet means for preventing retrograde movement of said follower, means for rotating said two ratchet means through an arc of 90° for rendering said ratchet means inoperative during the refilling operation, and means for filling said reservoir through said port.

6. A lubricant compressor of the class described, comprising a body providing a cylinder and a port communicating therewith, a piston reciprocable in said cylinder, a barrel attached to said body and forming a reservoir for said cylinder, said reservoir being in communication with said port, a follower in said reservoir, a ratchet rod located in said reservoir and extending through said follower, said piston having a cam shaped recess receiving one end of said rod, a head closing the end of said barrel remote from said body, said rod extending through said head and having a turned-over end outside of said barrel, a spring resting on said head and urging said rod and follower toward said piston, a pawl on said follower engaging said rod, a second ratchet rod extending through said head and follower and having a turned-over end outside of said barrel, a pawl carried by said follower and engaging said second rod, a second spring engaging said head to prevent backward movement of said second rod, said rods having smooth portions extending longitudinally thereof whereby rotation of said rods by said turned-over ends disengages said pawls from the ratchet provided by said rods, and a pawl-protecting rearward extension on said follower.

ERNEST W. DAVIS.

REFERENCES CITED

The following references are of record in the file of this patent:

UNITED STATES PATENTS

| Number | Name | Date |
|---|---|---|
| 1,585,538 | De Loach | May 18, 1926 |
| 1,672,421 | Negley | June 5, 1928 |
| 1,679,855 | Davis | Aug. 7, 1928 |
| 1,918,833 | Carter | July 18, 1933 |
| 2,175,601 | Grund | Oct. 10, 1939 |
| 2,233,587 | Crewe | Mar. 4, 1941 |

FOREIGN PATENTS

| Number | Country | Date |
|---|---|---|
| 185,494 | France | Oct. 16, 1936 |
| 623,866 | Germany | Jan. 7, 1936 |